June 14, 1927.
C. PEARSON
HITCH
Filed June 18, 1923   2 Sheets-Sheet 1
1,632,145
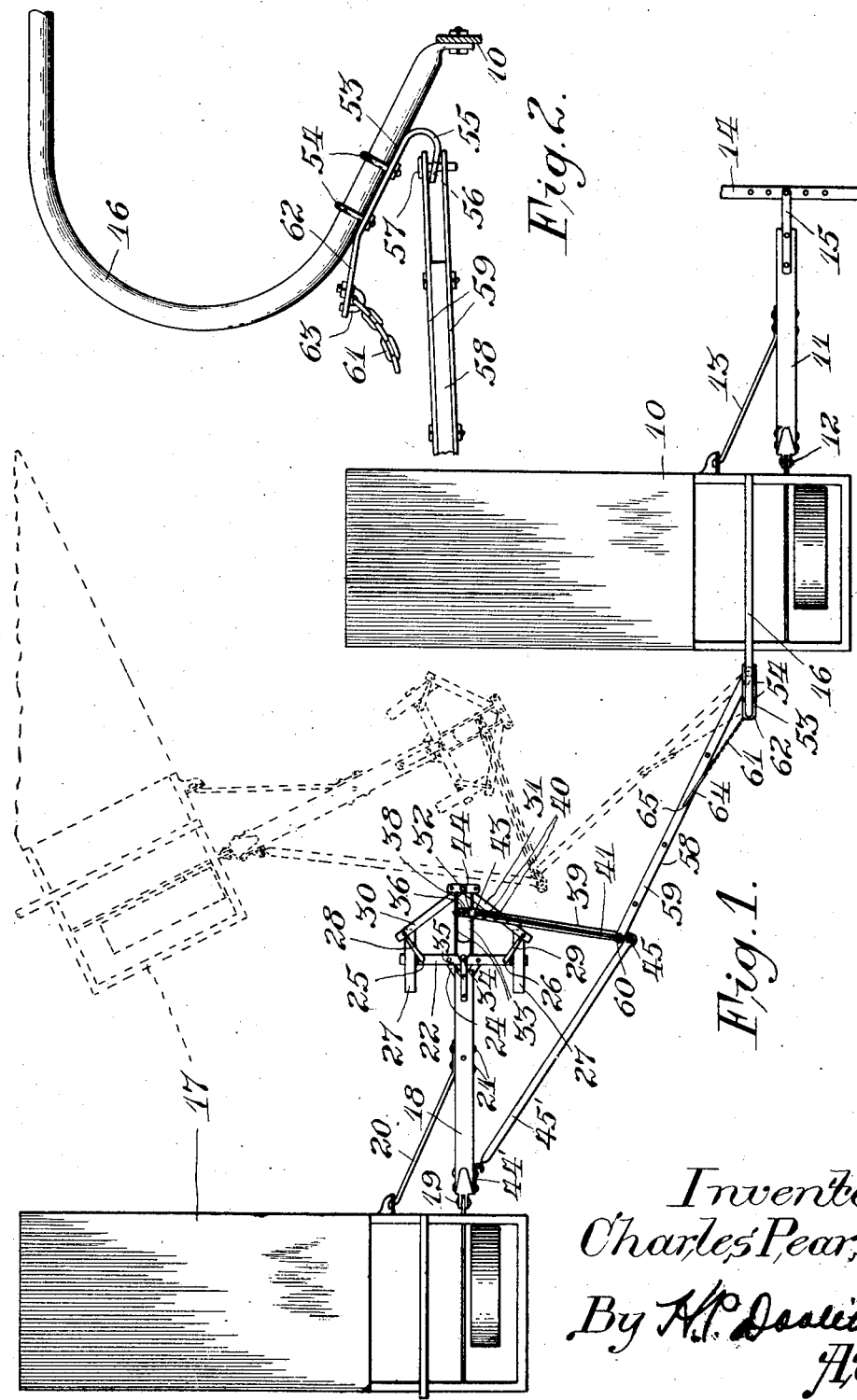
Inventor
Charles Pearson,
By H. P. Doolittle
Atty.

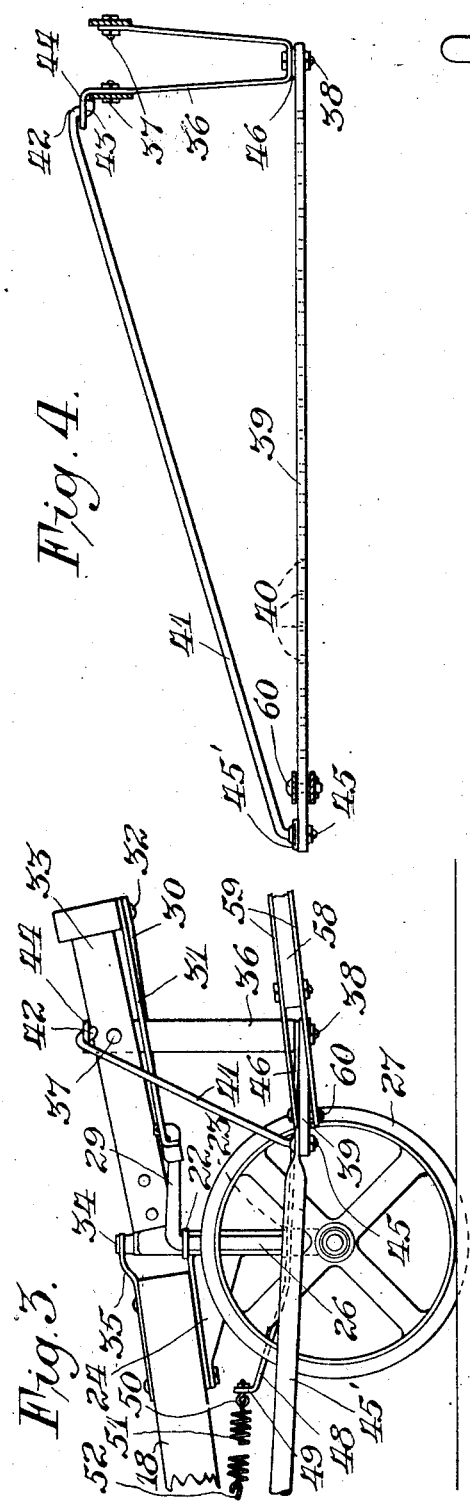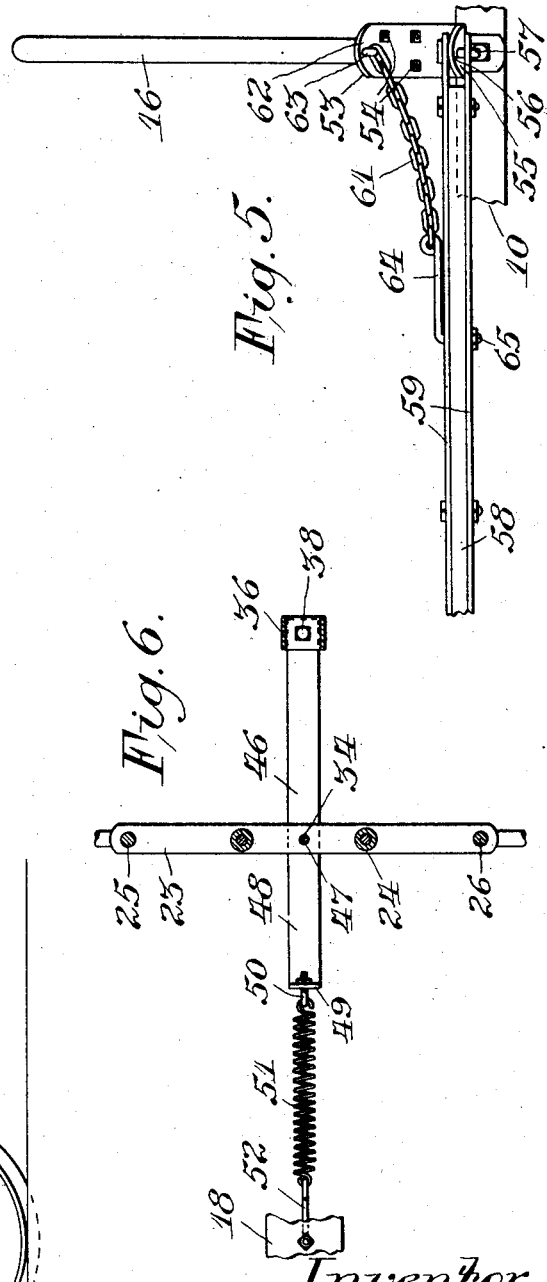

Patented June 14, 1927.

1,632,145

UNITED STATES PATENT OFFICE.

CHARLES PEARSON, OF CHICAGO, ILLINOIS, ASSIGNOR TO INTERNATIONAL HARVESTER COMPANY, OF CHICAGO, ILLINOIS, A CORPORATION OF NEW JERSEY.

HITCH.

Application filed June 18, 1923. Serial No. 646,038.

My invention relates to improvements in means for connecting together a plurality of harvesters or similar vehicles arranged one behind the other wherein the harvesters may be adjusted to travel in varying offset paths.

One of the objects of the present invention is to provide improved and simplified draft connections between successive harvesters.

Another object is to provide a draft connection from one of said harvesters to a succeeding one in which the connection also serves to control the steering elements of the latter harvester.

A further object is to provide means whereby the adjacent harvesters may be moved in a longitudinal direction relative to each other within certain limits.

A still further object is to provide means for normally returning the steering elements to a predetermined position.

These and other objects are obtained by providing a construction in which the connections or draft elements between adjacent harvesters control the steering mechanism of the harvesters.

Referring to the drawings—

Fig. 1 is a diagrammatic view showing the manner in which my improved tractor hitch is employed;

Fig. 2 is a detail side elevational view showing the manner in which the draft element is pivotally connected to the seat pipe of the preceding harvester;

Fig. 3 is a side elevational view showing the manner in which the forward end of the stub tongue of the harvester is supported;

Fig. 4 is a detail view of the offset bar connection;

Fig. 5 is a rear elevational view of the mechanism shown in Fig. 2; and

Fig. 6 is a detail plan view showing the mechanism for normally maintaining the steering wheels in a predetermined position.

In carrying out my invention, I have shown the same in connection with a plurality of harvesters wherein the harvesters are trailed in offset relation with respect to each other. In Fig. 1, there is shown a harvester 10 having the usual stub tongue 11 pivotally connected to the frame of the harvester at 12 and also pivotally connected to the harvester for reinforcing the tongue is a diagonal brace 13. The forward end of the stub tongue 11 is pivotally connected to a transverse bar 14 of the tractor (not shown) by draft straps 15. The harvester 10 is provided with the usual seat pipe 16. The mechanism thus described is the usual mechanism that is used for connecting up the first harvester to the tractor in drawing a plurality of harvesters in trailed relation because no steering mechanism is necessary on the first harvester. It will be understood, of course, that a steering mechanism may be employed for the first harvester in the same manner as will hereinafter be described for all the harvesters succeeding the first harvester.

The second harvester 17 is provided with a stub tongue 18 which is pivotally connected to the harvester at 19. The usual diagonal brace 20 is pivoted to the harvester 17 and secured to the stub tongue 18 at 21. Secured to the forward end of the stub tongue 18 and positioned transversely with respect thereto are parallel bars 22 and 23. These bars 22 and 23 are secured to the stub tongue by means of a bracket member 24. Pivotally mounted on the opposite ends of the bars 22 and 23 are crank axles 25 and 26. The crank axles 25 and 26 are provided with the usual truck wheels 27. The upper ends of the crank axles 25 and 26 are provided with outwardly and angularly disposed crank portions 28 and 29 respectively. The free ends of these cranks 28 and 29 are pivotally connected to converging bars 30 and 31. The forward ends of these bars 30 and 31 are pivotally connected at 32 to a forwardly extending member 33 which in turn is pivotally conneced to the transverse bar 22 by means of a pin 34. The upper end of the pin 34 is supported in its position by a strap 35 secured to the draft tongue 18. This mechanism thus described is the ordinary tongue truck mechanism which is now in general use and per se forms no part of the present invention.

The mechanism which forms my present invention will next be described. This mechanism comprises a U-shaped member 36 secured by means of bolts 37 to the member 33. The lower end of the member 36 has pivotally attached thereto at 38 a stub-blewardly extending offset bar 39. The offset bar 39 is provided with a plurality of spaced apertures 40 for the purpose hereinafter set forth. The free end of the bar 39 is braced by means of a rod 41, the upper end of the rod 41 having a goose-neck 42 formed thereon and being pivotally secured in an aperture 43 formed in a right angularly bent portion 44 of the member 36. The outer end of the bar 39 is pivotally secured to the outer end of the rod 41 at 45.

In carrying out my invention, I have provided means for normally maintaining the steering wheels parallel to the longitudinal travel of the harvester. This means comprises a longitudinally extending strap 46 having its forward end pivotally secured to the lower end of the bracket 36 on the bolt 38. The strap 46 is pivotally secured to the transverse bar 23 at 47. The rearward end of the strap 46 is upwardly inclined at 48 and has its rear end thereof bent in a vertical plane at 49. The portion 49 of the strap 46 is provided with a hook bolt 50 which in turn is connected to an extensible spring 51, the rearward end of the spring 51 being connected to a second hook bolt 52 which is connected to the stub tongue 18. By this construction, it will be noted that the spring 51 normally maintains or tends to return the strap 46 to the position parallel to the stub tongue 18 or, in other words, the spring 51 normally tends to hold the member 36 together with the member 33 in continuous alinement with the stub tongue 18 and thereby maintains the truck wheels in parallelism with the stub tongue causing the harvester to travel in a continuous and straightforward direction. The offset bar 39 has also pivotally connected at its outer end thereof, at 45, a supplemental draft member 45′ which converges toward the rear end of the tongue 18 and is pivotally connected thereto by means of a hook bracket 44′. The forward harvester 10 is provided with a bracket 53 secured to the lower side of the seat pipe 16 by means of U-shaped bolts 54. The lower end of the bracket 53 is provided with a rearwardly curved portion 55 which has an aperture 56. Pivotally connected to the curved portion 55 by means of a bolt 57 extending through the aperture 56 is a draft member 58 having longitudinal straps 59 extending throughout the entire length. The rear end of the draft member 58 is adapted to be connected or adjusted in the various apertures 40 of the offset bar 39 for varying the offset relation of the rear harvester with respect to the preceding one or, in other words, if for any reason it is desired to cut a greater swath of grain or offset the rear harvester with respect to the preceding harvester, the various adjustments of offset relation may be obtained by adjusting the draft bar 58 by means of the bolt 60 in the various apertures 40 of the offset bar 39.

I have also provided means for limiting the lateral swing of the draft member 58, which is necessary when the harvesters are descending a slope, for preventing the rear harvester from colliding or running into the preceding harvester. This construction comprises a flexible member 61 in the form of a chain which is connected to an angularly bent portion 62 of the bracket 53 by means of a hook bolt 63. The rear end of the flexible member 61 is connected to a swinging bolt 64 which in turn is pivotally connected at 65 to the draft member 58. By this construction, it will be seen, as shown in Fig. 2, that the pivot of the draft member 58 is positioned forwardly of the connection of the flexible member 61 with bracket 53 and that when the draft member 58 is swung from its normal longitudinal trailing position or from the position shown in full lines in Fig. 1 to that shown in dotted lines, that the flexible member becomes taut and thus limits or stops the further swing in the same direction or grainward direction of the draft member 58 and thereby prevents the rear harvester from colliding with the preceding harvester in going down an incline.

In the operation of my improved tandem draft connection, a plurality of harvesters may be connected up one behind the other in offset relation with respect to each other. When the harvesters are being drawn by the tractor in trailed relation across the field with the draft member 58 pivotally connected to the bracket 53 of the forward harvester and with the rear end of the draft member pivotally connected in the stubbleward aperture 40 of the offset bar 39, a forward pull at this point on the bar 39 swings the supplemental draft member 45′ about its pivot on the hook 44′ and this forces the offset bar 39 grainwardly, causing the member 33 to swing grainwardly about the pivot 34 and thus through the connections 30 and 31 with the crank arms 28 and 29 respectively, the truck wheels 27 are steered in a grainwardly direction and thereby offsetting the harvesters with respect to each other. This construction normally maintains the draft member 58 and the supplemental draft member 45′ in substantial diagonal alinement with respect to the longitudinal travel of the harvesters. It will be noted in connection with controlling and steering the truck wheels 27 that the spring 51 normally tends to maintain or return these wheels in parallel alinement with the normal longitudinal travel of the machine and thus when the wheels are diverted in either direction, the spring 51 returns them to their parallel position or the position shown in full lines in Fig. 1.

It will be noted by reason of the draft member 58 having its forward pivot in advance of the connection of the flexible member 61 that the same will be forced to swing grainwardly and toward the front harvester until the chain 61 becomes taut. This limits the longitudinal or forward movement of the second harvester toward the first harvester and thereby prevents collision between adjacent harvesters, when the harvesters are descending an incline.

In the above specification, I have illustrated and described my improved tandem hitch in connection with harvesters but it will, of course, be understood that the same is adaptable for use in connection with other vehicles and implements in which automatic means are used for offsetting the vehicles and implements in offset trailed relation with respect to each other.

What I claim as my invention and desire to secure by Letters Patent is:

1. In combination, a plurality of implements arranged in trailing relation, a draft connection between the implements including a tongue and steering truck, a draft member connected to the steering truck and draft connection, and means connecting the tongue and draft member for alining the steering truck with the line of draft of the implements.

2. In combination, a plurality of implements arranged in trailing relation, a draft connection between the implements including a tongue and steering truck, a draft member pivoted for horizontal movement to the steering truck and connected to the draft connection, and means positioned to the rear of the pivot of the draft member for alining the steering truck with the line of draft of the implements.

3. In combination, a plurality of implements arranged in trailing relation, a draft connection between the implements including a tongue and steering truck, a draft member pivoted to the steering truck and to the draft connection, and resilient means connecting the tongue and draft member for alining the steering truck with the line of draft of the implements.

4. In combination, a plurality of implements arranged in trailing relation, a draft connection between the implements including a tongue and steering truck, a draft member pivoted to the steering truck forwardly thereof and having an offset pivoted to the draft connection, and means coupled with the tongue and draft member for alining the steering truck with the line of draft of the implements.

5. In combination, a plurality of implements arranged in trailing relation, a draft connection between the implements including a tongue and steering truck, a draft member pivoted for horizontal movement to the steering truck and connected to the draft connection, and resilient means connecting the tongue and draft member for automatically alining the steering truck with the line of draft of the implements.

6. In combination, a plurality of implements arranged in trailing relation, a steering mechanism for one of said implements, a combined draft connection and steering control between the implements, and a flexible member connected to the draft connection and one of the implements for permitting a limited longitudinal movement of the implements with respect to each other.

7. A tandem draft connection for harvesters comprising a steering mechanism for one of said harvesters, and single means forming a draft connection between said harvesters and including means for controlling said steering mechanism, and means for permitting a limited longitudinal movement of said harvesters with respect to each other.

8. A tandem draft connection for harvesters comprising a stub tongue for one of said harvesters, a tongue truck including steering wheels for supporting the forward end of said stub tongue, a member pivoted to said stub tongue and connected to said steering wheels, and means pivoted to said member and connected to a draft member for maintaining said harvesters in offset relation with respect to each other.

9. A tandem draft connection for harvesters comprising a stub tongue for one of said harvesters, a tongue truck including steering wheels for supporting the forward end of said stub tongue, a member pivoted to said stub tongue and connected to said steering wheels, a second member pivoted to said first named member and connected at its outer end to a diagonally disposed supplemental draft member, and a draft member connected to said second named member for maintaining said harvesters in offset relation with respect to each other.

10. In combination, a pair of trailing implements, a tongue for the rear implement, a steerable wheel structure for supporting said tongue, a member connected to said structure and extending angularly in a lateral direction thereform, and a member connected to the forward implement, said member extending rearwardly and being connected to said angularly extending member, whereby said rearwardly extending member forms a draft connection between the implements and functions directly to transmit angling movement of the forward implement to the wheel structure for angling the same to steer the rear implement.

11. In combination, a pair of trailing implements, a tongue for the rear implement, a steerable wheel structure for supporting said tongue, a laterally extending member connected to and extending from said wheel structure, a supplemental draft connection connecting said laterally extending member and said tongue, and a main draft connection extending rearwardly from the forward implement and connected to said laterally extending member, whereby said main draft connection functions directly to trasmit angling movement of the forward implement to the wheel structure through the laterally extending member for angling the same to steer the rear implement.

In testimony whereof I affix my signature.

CHARLES PEARSON.